United States Patent [19]
Goldschlag et al.

[11] Patent Number: 6,108,644
[45] Date of Patent: Aug. 22, 2000

[54] SYSTEM AND METHOD FOR ELECTRONIC TRANSACTIONS

[75] Inventors: David M. Goldschlag, Silver Spring, Md.; Stuart Gerald Stubblebine, Lebanon, N.J.; Paul F. Syverson, Silver Spring, Md.

[73] Assignees: AT&T Corp., New York, N.Y.; Naval Research Laboratory, Washington, D.C.

[21] Appl. No.: 09/025,802

[22] Filed: Feb. 19, 1998

[51] Int. Cl.[7] .............................. G07F 19/00; G06F 17/30
[52] U.S. Cl. .................................. 705/69; 705/75; 380/277
[58] Field of Search .............................. 709/250; 705/51, 705/69, 75; 380/24, 30, 277

[56] References Cited

U.S. PATENT DOCUMENTS

| | | | |
|---|---|---|---|
| 4,759,063 | 7/1988 | Chaum | 380/30 |
| 4,759,064 | 7/1988 | Chaum | 380/30 |
| 4,914,698 | 4/1990 | Chaum | 380/30 |
| 4,949,380 | 8/1990 | Chaum | 380/30 |
| 4,991,210 | 2/1991 | Chaum | 380/30 |
| 5,115,392 | 5/1992 | Takamoto et al. | 395/671 |
| 5,175,766 | 12/1992 | Hamilton | 380/49 |
| 5,511,121 | 4/1996 | Yacobi | 705/69 |
| 5,606,617 | 2/1997 | Brands | 705/69 |
| 5,812,668 | 9/1999 | Weber | 380/24 |
| 5,850,446 | 12/1999 | Berger et al. | 380/24 |
| 5,857,023 | 1/1999 | Demers et al. | 380/24 |
| 5,872,844 | 2/1999 | Yacobi | 705/69 |
| 5,878,138 | 3/1999 | Yacobi | 705/69 |
| 5,892,900 | 4/1999 | Ginter et al. | 713/200 |
| 5,931,917 | 8/1999 | Nguyen et al. | 709/250 |
| 5,943,423 | 8/1999 | Muftic | 380/25 |

FOREIGN PATENT DOCUMENTS

| | | | |
|---|---|---|---|
| WO 97/31034 | 3/1996 | Armenia | H04L 9/32 |
| WO 97/02679 | 1/1997 | Armenia | H04L 9/32 |
| 0 938 068 | 2/1999 | Austria | G07F 19/00 |

OTHER PUBLICATIONS

Schneier, Bruce. "Applied Cryptography: Protocols, Algorithms, and Source Code in C." 2d (New York: John Wiley & Sons, Inc., 1996) pp. v, 112–115, Jan. 1996.

Lynch Daniel C. and Lesley Lundquist. "Digital Money: the New Era of Internet Commerce." (New York: John Wiley & Sons, Inc., 1996) pp. iii, iv, v, vi, 112–115, 179–182 & 279, Jan. 1996.

Mao, Wenbo. Blind Certification of Public Keys and Off–line electronic Cash. "HP Labs Technical Reports." HPL–96–71 (May 16, 1996) p. 1, Jan. 1996.

D. Chaum, "Untraceable Electronic Mail, Return Addresses, and Digital Pseudonyms", CACM 24, 2, Feb. 1981, pp. 84–88.

D. Chaum, "Security Without Identification: Transaction Systems to Make Big Brother Obsolete", CACM (28, 10), Oct. 1985, pp. 1030–1044.

D. Chaum, A. Fiat, and M. Naor, "Untraceable Electronic Cash", CRYPTO88, pp. 319–327.

L. Cottrell, "Mixmaster and Remailer Attacks", http://obscura.obscura.com/loki/remailer.essay.html.

D. Simon, "Anonymous Communication and Anonymous Cash", CRYPTO96, pp. 61–73.

P. Syverson, D. Goldschlag, and M. Reed, "Anonymous Connections and Onion Routing", Proceedings of the IEEE Symposium on Security and Privacy, IEEE CS Press, May 1997.

P. Syverson, S. Stubblebine, and D. Goldschlag, "Unlinkable Serial Transactions", *Financial Cryptography—FC97*, Anguilla BWI, Feb. 1997, final proceedings forthcoming from Springer–Verlag, LNCS, vol. 1318.

*Primary Examiner*—James P. Trammell
*Assistant Examiner*—John Leonard Young
*Attorney, Agent, or Firm*—Kenyon & Kenyon

[57] ABSTRACT

A system and method for performing an electronic transaction, including registration, audit and trusted recovery features. A transaction request message is received from a registered user that includes an unblinded validated certificate, and a blinded unvalidated certificate. If the unblinded validated certificate is determined to be legitimate, then a transaction can be performed, and the blinded unvalidated certificate is validated to obtain a blinded, validated certificate that is sent to the user. An audit protocol can be used to further verify the legitimacy of the transaction request message, and a user can recover from a broken connection by replaying a protocol run.

27 Claims, 5 Drawing Sheets

SYSTEM AND METHOD FOR ELECTRONIC TRANSACTIONS

FIELD OF THE INVENTION

The field of this invention is electronic transactions, and in particular to providing electronic transactions that cannot be linked to a party to the transaction, even when more than one related transaction occur.

BACKGROUND OF THE INVENTION

Electronic transactions should be convenient, reliable, accurate and resistant to fraud. Certain electronic transactions should also protect the privacy of at least one party to the transaction. For example, a customer purchasing a service from a vendor over a network should be able to pay for the service in an electronic transaction without revealing their identity.

The need for one party to a transaction to remain private (e.g., anonymous) can conflict with the interests of another party to the transaction. For example, a vendor needs assurance that the an electronic transaction is reliable, e.g., that the customer in the transaction will pay for the services rendered by the vendor. Typically, a vendor uses information about a customer to assess the vendor's risk in engaging in the transaction, and to track down delinquent customers when necessary. A good electronic transaction system would accommodate both the privacy needs of one party and the reliability needs of another party.

Known electronic transaction systems generally fail to accommodate both privacy interests and reliability interests of different parties, typically sacrificing one in favor of the other. One known system, an anonymizer, protects the identity of a customer from being disclosed to a vendor, but the customer identity is known to the anonymizer, and a customer's activity can be profiled across vendors. See Community ConneXion, Inc. <http://www.anonymizer.com>. In a sense, the anonymizer is worse than a single vendor, because a single vendor can typically only profile a customer's behavior with respect to the vendor itself. On the other hand, the anonymizer can profile customer transactions across several vendors, not just one. The customer is thus forced to place considerable trust in the anonymizer, which if unwarranted, could lead to a substantial breach of the customer's privacy.

Another known system uses electronic cash ("e-cash"), wherein a customer obtains an electronic certificate that is redeemable at a vendor for the vendor's product. See D. Chaum, Untraceable Electronic Mail, Return Addresses, and Digital Pseudonyms, CACM 24, 2, Febuary 1981, pp. 84–88; D. Chaum, Security Without Identification: Transaction Systems to Make Big Brother Obsolete, CACM (28,10), October 1985, pp. 1030–1044; D. Chaum, A. Fiat, and M. Naor, Untraceable Electronic Cash, CRYPTO88, pp. 319–327; E. Brickell, P. Gemmell, and D. Kravitz, Trustee-based Tracing Extensions to Anonymous Cash and the Making of Anonymous Change, Proceedings of the Sixth Annual ACM-SIAM Symposium on Discrete Algorithms, pp. 457–466, San Francisco, Calif., 22–24 January 1995; M. Franklin and M. Yung, Towards Provably Secure Efficient Electronic Cash, Columbia University CS Technical Report, TR CUCS-018–92, 1992; and D. Simon, Anonymous Communication and Anonymous Cash, CRYPTO96, pp. 61–73. One known system uses credit card information to carry out an electronic transaction. Secure Electronic Transaction (SET) Specification, Aug. 1, 1996. As used herein, the term "product" includes a good and/or a service. Providing a service includes providing any kind of information. The electronic certificate is meant to be spent only once, and can be verified by the vendor before the vendor provides the product. One type of fraud to which these known systems can be vulnerable is the multiple spending of a certificate. Elaborate safeguards have been designed to detect when a certificate submitted for a product has already been spent. Many of these safeguards involve revealing the identity of the customer, thereby violating the customer's privacy.

A known technique for protecting the anonymity of a certificate owner is called blinding. See D. Chaum, Untraceable Electronic Mail, Return Addresses, and Digital Pseudonyms, CACM 24, 2, Febuary 1981, pp. 84–88; D. Chaum, Security Without Identification: Transaction Systems to Make Big Brother Obsolete, CACM (28,10), October 1985, pp. 1030–1044; and D. Chaum, A. Fiat, and M. Naor, Untraceable Electronic Cash, CRYPTO88, pp. 319–327. A customer chooses a nonce and a blinding factor. A nonce is a piece of data that, for practical purposes, is used only once. For example, a random number can be a nonce. Both the nonce and the blinding factor are known only to the customer. The customer applies the blinding factor to the nonce (e.g., by multiplying the nonce by the blinding factor), and submits the blinded nonce to a certification authority along with a payment. In exchange for the payment, the certification authority signs the blinded nonce to obtain a blinded certificate. The blinded certificate is returned to the customer. When the customer wishes to make a purchase, the customer unblinds the certificate (e.g., by dividing the certificate by the blinding factor) to obtain an unblinded certificate. Because only the customer knows the blinding factor, no other party can correlate the unblinded certificate with the blinded certificate. The customer submits the unblinded certificate along with the nonce to a vendor with a request for the desired product. The vendor can verify the validity of the unblinded certificate using the nonce upon which it is based using techniques known in the art. Because of the commutativity of modular arithmetic and the mathematical nature of the signing process, the signed nonce corresponds to the unblinded certificate. If the unblinded certificate is determined to be valid, then the vendor makes the product available to the customer. Otherwise, the product is not made available to the customer.

Although the use of blinding alone protects the anonymity of the customer, it is not sufficient to safeguard against certain types of fraud. For example, a customer can submit a blinded nonce to the certification authority along with $20, receive the blinded certificate, unblind it, and then submit the unblinded certificate as being worth $100. This is possible because the certification authority never really sees the actual certificate it is signing because of the blinding factor. Thus, although blinding alone protects privacy, it does not by itself provide adequate reliability.

The problem of reliably linking a denomination to a certificate is addressed by the use of hash functions. A hash is a one-way function whereby it is easy to obtain an output from a given input, but is very difficult to derive an input from a given output. To obtain a certificate that only a particular customer can use, the customer presents a certification authority (e.g., a bank) with a payment and a hashed nonce. The hash function used by the customer is also known by the bank. The bank signs the hashed nonce linked to a denomination to obtain a certificate, which is returned to the customer. To use the certificate, the customer redeems the certificate, the nonce and the denomination to a vendor, who in turn presents the certificate, the nonce and the denomination to the bank. The bank verifies the certificate using a publicly available verification key. If the certificate is verified as being valid, then the bank authorizes the vendor to provide the customer with the requested product, and credits the vendor's account. If the signature and the certificate do not correspond, then the bank notifies the vendor that the certificate is invalid. After the certificate is spent, the bank must record the hashed random number to prevent it from being spent again. The use of hash functions alone is reliable because in order to fraudulently spend a certificate, a third party would have to deduce the nonce from the certificate. This is made practically impossible by using a hash function to derive the certificate from the nonce. However, since the customer's certificate is known to the bank both during the initial certification process and the redemption process, the identity (and thus the privacy) of the customer can be compromised by the bank.

Balancing privacy and reliability interests across more than one transaction is challenging because a transaction which is reliable and private alone can often be correlated with other transactions from the same customer to compromise privacy, reliability, or both in known systems. Thus, a series of transactions could be unreliable and compromise privacy. As used herein, a series of transactions is meant to include both a single transaction, as well as more than one transaction. Privacy and reliability should be provided for both the case of a single transaction, and more than one related transaction.

An example of a series of transactions is a subscription service, e.g., paying a fee for a password that can be used to repeatedly access a service for a predetermined amount of time and/or use. A subscription service is one in which the customer pays an initial amount to receive a product from a vendor in installments. Note that in the degenerate case, a subscription service includes only a single transaction. In certain known electronic commerce systems, the customer makes an initial payment to a subscription vendor, who in return gives the customer means (such as a password) to periodically obtain the vendor's product over a predetermined period of time. Subscriptions are commonly sold on an individual basis. Under such a policy, for example, two individuals seeking a subscription should pay the vendor separately; each would then receive her own subscription and password. If one individual pays for a subscription and shares her password with a second person, then two people are able to receive the subscription vendor's product while only one is paying for it. This problem of sharing distinguishes an e-commerce system suitable for subscription services from known systems such as e-cash. In e-cash systems, a certificate is meant to be fungible and readily transferable. In an e-commerce system capable of supporting subscription services, such transferability must be prevented or curtailed.

To counter the sharing's threat to the reliability of a subscription transaction, the subscription vendor has a strong interest in monitoring the subscribing customer's behavior to ensure that the customer is not sharing her subscription with others who have not paid the vendor. For example, unusually high activity in a single account could indicate fraud, e.g., that many different individuals are making use of a single subscription. On the other hand, the customer may prefer to have her privacy respected and not to have her activity monitored. For example, a customer subscribing to a database service may wish to keep the searches she makes private. Likewise, a customer ordering pay-per-use movies may wish to keep the identity of the movies he orders confidential. These privacy interests should be accommodated by a good electronic transaction system in a subscription-type setting. Known techniques exist for issuing pseudonyms, thus linking customer behavior to the pseudonym rather than to the customer. However, these still allow profiles (e.g., of customer behavior) to be constructed if even one pseudonymous transaction is broken or accidentally identifies the customer. Then, all of the customer's past and future behavior can be linked to that customer. A better system for electronic transactions would not suffer from this limitation.

A good electronic transaction system would accommodate both the needs of the customer for privacy and of the vendor for reliability in a single electronic transaction, and in more than one related transaction, in part by preventing sharing.

SUMMARY OF THE INVENTION

The present invention advantageously uses the exchange of blinded certificates to provide a reliable, private system for electronic transactions that deters the illicit sharing of certificates for such transactions. Rather than operating like e-cash, in which a payment vehicle is redeemed for a product (as used herein, the term "product" means goods and/or services) in a way that changes the funds available to the customer, the present invention acts more like a membership pass. That is, the customer starts with a certificate, gains access to a product in exchange for the certificate, and ends with both the product and a certificate. Unlike e-cash, the value of the customer's use of certificates in accordance with the present invention is related to the amount of time (or number of certificates) remaining in the customer's contract (e.g., membership or subscription term). Theoretically, this could allow the customer to be profiled by tracking the number of certificates used (or available for use) by the customer. However, this would not be a practical problem for applications where, for example, thousands of people subscribe to something that can only be used 5 times. Indeed, knowing that a customer has, say, three certificate redemptions left cannot reveal very much to a vendor. Audit and trusted recovery methods are provided to enhance the security and robustness of the present invention.

The present invention is private and reliable both for a single electronic transaction, and a series of related transactions. In accordance with an embodiment of the present invention, a first party (e.g., a customer) registers with a registrar to obtain an initial validated certificate. In one embodiment, the registrar is a second party. In subsequent transactions, a first party (e.g., a customer) submits a validated certificate along with an unvalidated certificate to a third party (e.g., a vendor) for each transaction. The third party tests the validity of the certificate purported by the first party to be validated. If it proves to be valid, the third party performs a response action (e.g., provides a service) and ordinarily validates the unvalidated certificate and returns it to the first party to be used as the validated certificate for the next transaction. Alternatively, the registrar (if different from the third party, then in cooperation with the third party) can declare an audit, and determine if the first party has presented its certificate fraudulently. These exchanges are atomic in nature, meaning that they can be reliably correlated with each other (e.g., a practically unforgeable secret session key is sent along with each related message in the exchange, guaranteeing that the messages are part of the same transaction).

In an alternative embodiment, the registrar is a vendor.

Hashing of random numbers (i.e., nonces) and the technique of blinding are used in the present invention to provide unlinkable certificates. As known in the art, the technique of blinding is used differently, e.g., to provide pseudonyms in an alternative to a universal identification system. See D. Chaum, Security Without Identification: Transaction Systems to Make Big Brother Obsolete, CACM (28,10), October 1985, pp. 1030–1044. Each such pseudonym is supposed to identify its owner to some institution and not be linkable across different institutions. The present invention is designed to provide certificates that are designed to be unlinkable both across institutions and across transactions within a single institution. In particular, the present invention prevents a vendor from linking transactions to a single customer, even if that customer had to identify itself initially (e.g., during the registration process). At the same time, the present invention advantageously allows the vendor to protect itself against customers that abuse the vendor's service.

Another difference between the present invention and the prior art is the manner in which blinding is performed. In known systems, some mechanism is typically needed to assure either the issuing bank or receiving vendor that the certificate blindly signed by the issuer has the right form, i.e., that the customer has not tricked the signer into signing something inappropriate. The present invention advantageously eliminates this requirement by providing assurances in other parts of the system, simplifying the blinding scheme.

DETAILED DESCRIPTION

Figure 1:
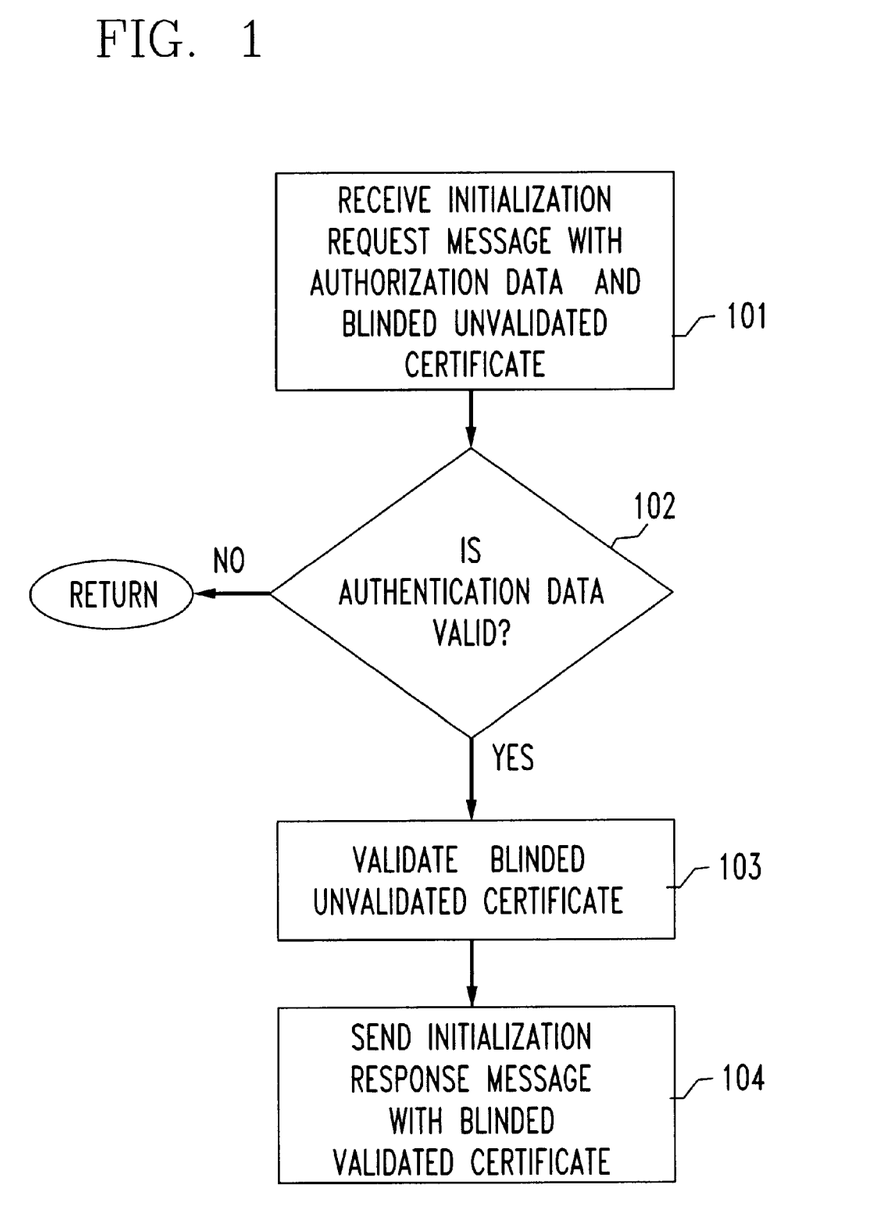
FIG. 1 shows a flow chart illustrating an embodiment of the initialization method of the present invention.

An embodiment of the registration method in accordance with the present invention is shown in FIG. 1. A registrar receives an initialization request message that atomically binds authorization data with a blinded unvalidated certificate to be validated, step 101. In one embodiment of the present invention, the registrar is a vendor. In another embodiment, the registrar is a third party.

An example of authorization data is a payment. Another example of authorization data is access permission (e.g., an access code, one-time password, etc.) An example of a blinded unvalidated certificate is a hashed nonce combined with a blinding factor.

The registrar determines if the authorization data is valid, step 102. If it is determined to be valid, then the blinded unvalidated certificate is validated to obtain a blinded validated certificate, step 103. For example, the registrar signs the blinded unvalidated certificate to validate it. The registrar party then sends an initialization response message that includes the blinded validated certificate atomically bound to the initialization request message, step 104. The initialization request message can be atomically bound to the initialization response message by including in both a secret encrypted session key that reliably identifies both messages as being bound to each other.

An embodiment of the registration protocol is shown in the following exchange of messages:
Message 1: C→V: {Payment, Kcv},[Request for certificate of type S, C, h(N1)]Kcv
Message 2: V→C: [h(N1)]s The first message is from a customer with customer identifier C to a registrar, which in this embodiment is vendor V. The portion of the message in the brackets { } is confidential. For example, in one embodiment, the portion of the message in the brackets is encrypted. In another embodiment, the confidentiality of this portion of the message is protected by sending it over a secure path between C and V. The confidential portion of the message in this embodiment is a Payment and a "session key," Kcv. The Payment in one embodiment is electronic cash. In another embodiment it is a credit card number. Session key Kcv is used throughout a single protocol run (e.g., of registration, redemption, etc.), although it should be changing in a way that depends on the previous messages of that run. However, a session key from one transaction should be unrelated to the session key of any other transaction in order to prevent a set of transactions from being linked. It should be noted that a "run" or single transaction refer to an embodiment of a single instance of a method in accordance with the present invention. For example, a single run of an embodiment of a redemption transaction would involve: receiving a transaction request message that atomically binds an unblinded certificate and a blinded unvalidated certificate to be validated; determining if the unblinded certificate is valid; and if the unblinded certificate is valid, then performing a transaction response that includes validating the blinded unvalidated certificate to obtain a validated blinded certificate; and sending the validated blinded certificate atomically bound to the transaction request message to a transaction response recipient in a transaction response message.

Figure 2:
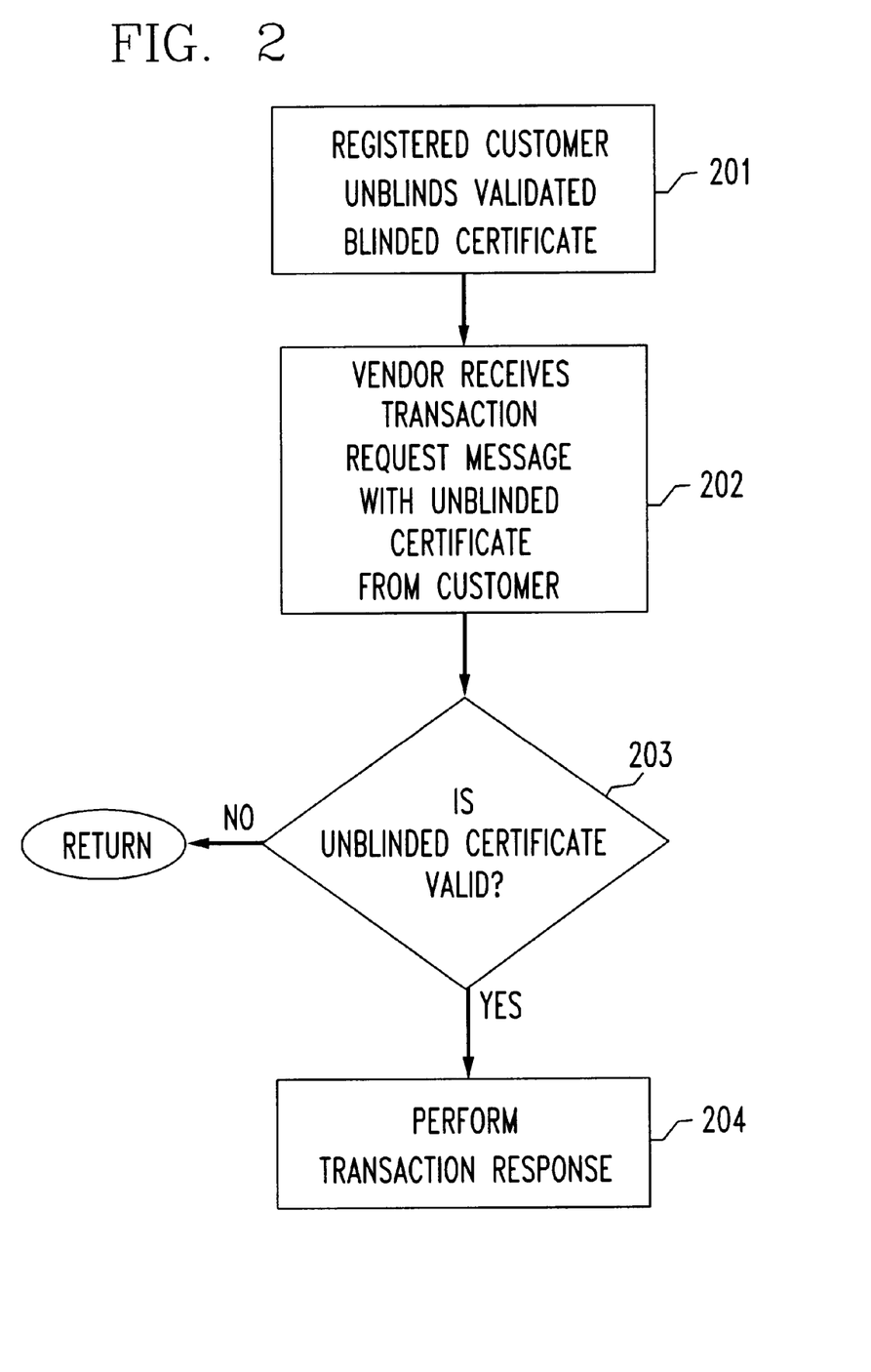
FIG. 2 shows a flow chart illustrating an embodiment of the electronic transaction method of the present invention.

The portions of the Messages in the braces [ ] is authenticated. That is, the recipient is provided with the means to ensure that the purported sender is the true sender. As shown above, the portion of the message in the braces is authenticated by signing it with the cryptographic key secretly sent in the confidential portion of the message. The authenticated portion includes a request for a certificate for a particular type of service, S, the customer identifier, C, and a blinded hashed nonce H(N1). The nonce N1 is hashed so that, given the hashed nonce h(N1), it is difficult to obtain the corresponding nonce, N1, but given the nonce, N1, it is relatively straightforward to obtain the hashed nonce, h(N1). This is an advantageous property during the redemption process. In one embodiment, the registration process further includes an authenticated acknowledgment message:
Message 3: C→V: [Ack]Kcv An embodiment of the redemption process in accordance with the present invention is shown in FIG. 2. A first party (e.g., a customer) unblinds a validated blinded certificate, step 201. The blinded validated certificate was validated either by a registrar as the result of a successful registration (see FIG. 1, step 103), or by a second party (e.g., a vendor) as the result of a successful earlier redemption. A transaction request message is received at the second party from a registered first party (e.g., a registered customer), step 202. The transaction request message atomically binds an unblinded certificate with a blinded unvalidated certificate to be validated. In one embodiment of the present invention, the blinded unvalidated certificate is a blinded hashed nonce. The second party determines if the unblinded certificate is valid, step 203 If the unblinded certificate is valid, then a transaction response is performed, step 204.

An embodiment of the redemption process is shown in the following exchange of messages:

Message 1: C→V: {[h(N(i))]s, Ni, Kcv}[Request for transaction of type S, h(N(i+1))]Kcv Message 2: V→C: [Approved]Kcv OR [Not Approved]Kcv Message 3: c<→V: [Transaction]Kcv Message 4: V→C: [h(N(i+1))]s In Message 1, a validated unblinded hashed nonce h(Ni) is sent with the nonce, Ni and key Kcv are sent confidentially from the customer C to the vendor V. Also sent is an authenticated request for a transaction of type S and an unvalidated blinded hashed (new) nonce, h(N(i+1)). The vendor performs the one-way hash function on nonce Ni and compares the result to the validated unblinded hashed nonce h(Ni). If the two correspond, then the vendor determines that the validated unblinded hashed nonce is a valid certificate, sends an approval message in Message 2, and engages in the transaction in Message 3. Finally, the vendor validates the blinded hashed nonce of Message 1 and sends it to the customer. In one embodiment, the customer then sends an authenticated acknowledgment message upon receiving the validated blinded hashed nonce from the vendor:

Message 5: C→V: [Ack]Kcv

In one embodiment of the present invention, a transaction response includes validating the blinded unvalidated certificate to obtain a validated blinded certificate, and sending the validated blinded certificate atomically bound to the transaction request message to a transaction response recipient. A transaction response recipient can be the first party (e.g., customer) or another party. For example, in one embodiment, a transaction response is a gift sent to a third party. In another embodiment, a transaction response message is a control signal sent to a piece of factory equipment. In one embodiment, the present invention provides a way for anonymous monitoring of a piece of equipment. When the status of the equipment is desired by an authorized (i.e., registered) entity, the entity sends an unblinded validated certificate and blinded unvalidated certificate to the equipment, which sends back status data along with a validated blinded certificate in accordance with the present invention.

In a subscription service, the certificate exchange may be repeated each time the subscriber (the first party) purchases an installment of the subscription from the vendor (the second party). An installment of the subscription can include the transmission of information that is sent each time a validated blinded certificate is sent to the subscriber. For example, the results of a database search can be sent each time a validated blinded certificate is sent to the subscriber.

In one embodiment of the present invention, audit data is included to help protect against fraud. The transaction request message atomically binds an unblinded certificate, a blinded unvalidated certificate to be validated, and blinded audit data. Not every message is audited, so the blinding of the audit data protects the privacy of the first party when no audit is performed.

Audits are typically performed randomly in accordance with the present invention. However, audits can also be triggered, for example, by unusual service activity that may indicate that a subscriber is sharing its certificates with other, non-paying parties. For example, an exceptionally high volume of traffic accessing a database or telephone service may indicate a heightened necessity for audits of transaction requests accessing the database or service.

Figure 3:
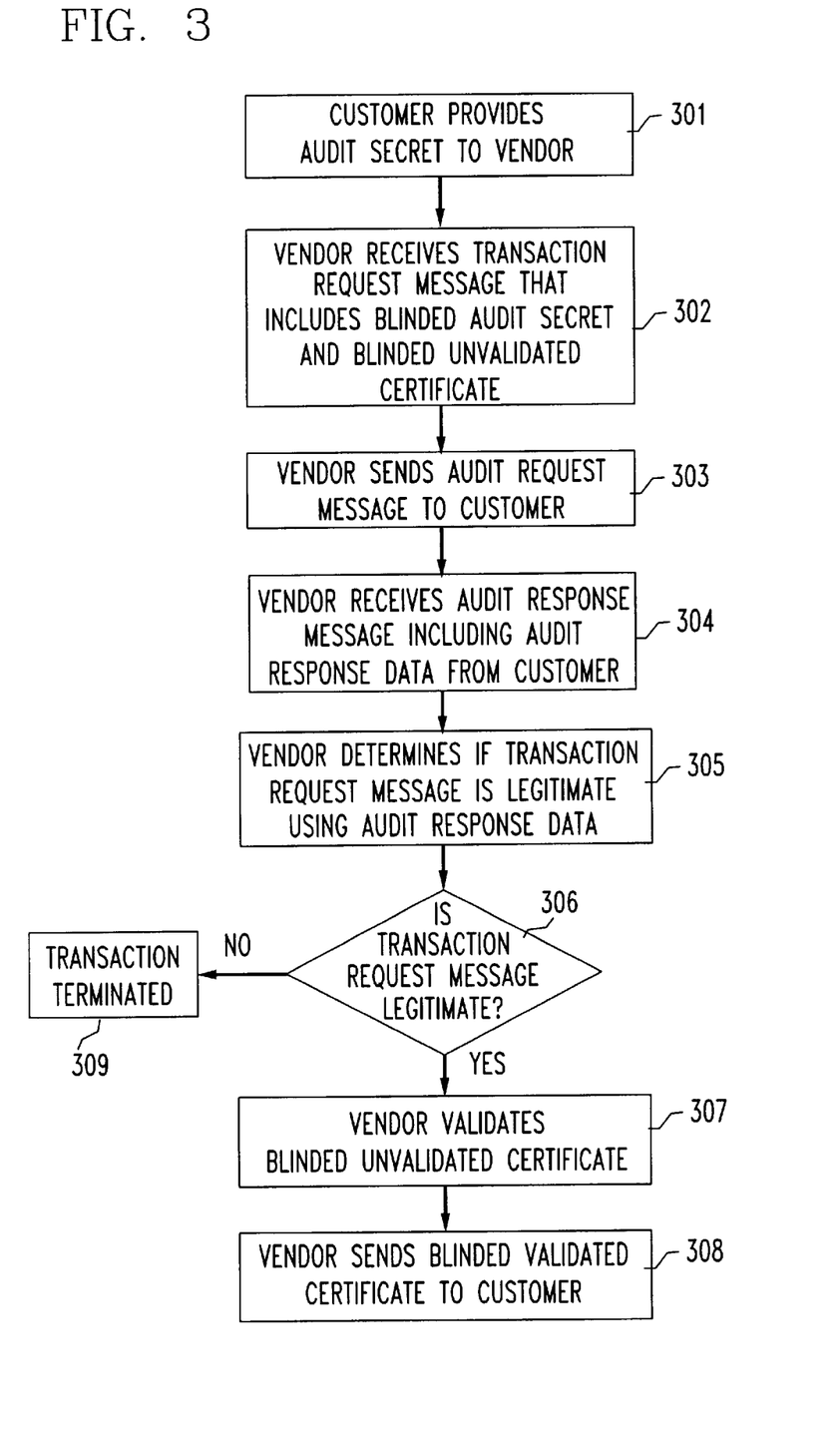
FIG. 3 shows a flow chart illustrating an embodiment of the audit method in accordance with the present invention.

An embodiment of the audit method in accordance with the present invention is shown in FIG. 3. During registration, the customer provides an audit secret to the registrar, step 301. In this embodiment, the registrar is also the vendor. In another embodiment, the registrar is a third party. During the redemption process, every transaction request message from the customer includes a blinded version of the audit secret. Thus, the vendor receives a transaction request message with a blinded audit secret, step 302. Rather than sending an audit response message to the customer, the vendor sends an audit request message atomically bound to the transaction request message, step 303. The vendor receives an audit response message from the customer that includes audit response data, step 304. In one embodiment, the audit response data includes an audit secret and the audit blinding factor. As with the blinded certificate, the audit blinding factor is combined with the audit secret in transaction requests to hide the audit secret from the vendor until an audit is initiated by the vendor. The vendor determines if the transaction request message of step 302 is legitimate using the audit response data, step 305. In one embodiment, the transaction request message is legitimate if the audit secret combined with the blinding factor provided in the audit response message corresponds to the blinded audit secret received in the transaction request message of step 302. If the transaction message of step 302 is determined to be legitimate, step 306, then the vendor validates the blinded unvalidated certificate received from the customer in the transaction request message of step 302, step 307. The vendor then sends the validated blinded certificate to the customer, step 308. If the transaction request message of step 302 is determined not to be legitimate, step 306, then in one embodiment, the customer's transaction is terminated, step 309. That is, no certificate is validated and returned to the customer.

An embodiment of the redemption process with audit features included in accordance with the present invention is shown in the following exchange of messages:

Message 1: C→V: {[h(N(i))]s, Ni, Kcv}[Request for transaction of type S, h(N(i+1)), h(Ni, Audit_Secret, Salt)] Kcv Message 2: V→C: [Approved]Kcv OR [Not Approved]Kcv OR [Audit]Kcv Message 3: C<→V: [Transaction]Kcv Message 4: V→C: [h(N(i+1))]s The messages are the same as for the redemption protocol except for the following: First, a hashed combination of the nonce Ni, audit secret $Audit_{13}$ Secret and Salt is included in Message 1. Salt is a random number that is a nonce. The purpose of Salt is explained below. Second, a response option has been added to Message 2, i.e., initiating an audit with an authenticated audit initiation message [Audit]Kcv.

An embodiment of the audit process in accordance with the present invention is shown as follows:

Message 1: C→V: {[h(N(i))]s, Ni, Kcv}[Request for transaction of type S, h(N(i+1)), h(Ni, Audit_Secret, Salt)] Kcv Message 2: V→C: [Audit]Kcv Message 3: C→V: {C, Ni, Audit_Secret, Salt}Kcv Message 4: V→C: [H(N(i+1))]s OR [Not Approved]Kcv Message 1 is a transaction request with audit features. In message 2, the vendor V initiates an audit by sending an authenticated audit initiation message. The customer sends an audit response message to the vendor. The audit response message in this embodiment includes audit data comprising the customer identifier, C, the nonce Ni, an audit secret Audit_Secret, and Salt. The vendor in this embodiment is also the registrar, and so has the Audit_Secret received from customer C during the registration process. First, the vendor compares the audit secret received in Message 3 with the audit secret received from the customer in the customer's registration message. These must correspond in order for the vendor to determine that Message 1 is legitimate. The vendor also hashes the audit secret, nonce and salt received in Message 3 and compares it to the hashed combination of the audit secret, nonce and Salt received in Message 1. These must also correspond so that the vendor knows that the audit secret provided by the customer in Message 3 is the same as the audit secret embedded in Message 1. If both of these correspondences are established, then the transaction response message (Message 1) is determined to be legitimate, and a validated blinded hash is sent to the customer in Message 4. In one embodiment of the present invention, an authenticated acknowledgment message is sent from the customer to the vendor when the customer receives Message 4:

Message 5: C→V: [Ack]Kcv

The purpose of the Salt in the above messages is to protect the anonymity of the customer and the unlinkability of the customer's transactions based upon audit information. Without Salt, a vendor could associate a transaction request message with a customer's identity using h(Ni,Audit_Secret) received in the transaction request message. Recall that when the vendor is the registrar, the vendor has a record of audit secrets received during the registration process from customer, with each audit secret associated with a customer identifier. A vendor could hash the nonce Ni received in a transaction request message with the audit secrets it knows from registration until a match is found with the audit data received in the transaction request message. In order to prevent such an exhaustive search from revealing a customer identity, nonce Salt is hashed with the audit secret and nonce Ni in each transaction response message. Because Salt is a nonce, it changes from message to message, rendering the audit data in a transaction request message untraceable by the vendor.

The audit features of the present invention advantageously deter the illicit sharing of certificates. A non-paying party is not likely to have the audit secret, which in one embodiment is a credit card number, or other valuable data for which the registered customer has a strong incentive to keep confidential. This provides a disincentive for sharing the data that is needed to pass an audit. Illicitly sharing a subscription also incurs a risk of subscription termination, and is thereby further deterred by the present invention.

The present invention terminates a series of transactions simply by not validating and returning an unvalidated blinded certificate as part of the last transaction.

The present invention further provides for trusted recovery from a broken connection, or from some other interruption in the methods of the present invention. In one embodiment of the present invention, an interrupted protocol is replayed in its entirety (except for the actual transaction, which is always skipped) with the same session key, nonce and blinding factor. The present invention advantageously does not release any new information when a protocol is replayed.

In one embodiment, broken protocols are considered to be automatically acknowledged after some predetermined period of time, after which the customer cannot recover from the break, and replay is not allowed. If a connection breaks after the receipt of a new validated blinded certificate has been acknowledged by the customer in the redemption protocol, then the customer can simply use the new certificate in the next transaction request.

Figure 4:
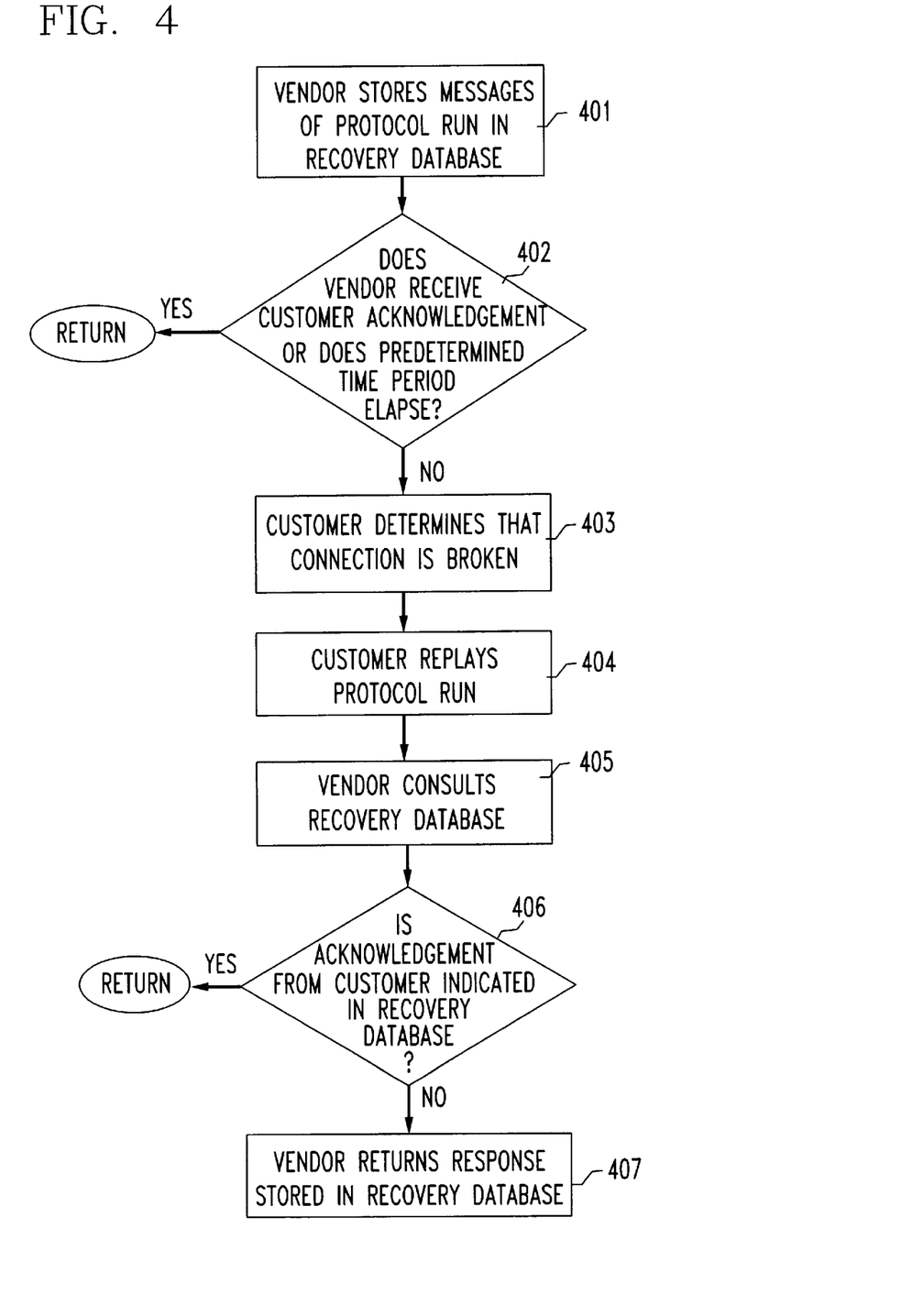
FIG. 4 shows a flow chart illustrating an embodiment of the method for recovering from a broken connection in accordance with the present invention.

If the connection breaks before the customer has received the new validated blinded certificate in the redemption protocol, then the protocol is replayed. An embodiment of the trusted recovery protocol is shown in FIG. 4. The vendor stores the messages of each protocol run (one instance of Messages 1 through 4 of the redemption protocol above), step 401 until the vendor receives an acknowledgment message from the customer indicating that the customer has received the new certificate (Message 5 in the redemption protocol), or until the predetermined automatic acknowledgment time has elapsed, step 402. When the customer realizes the connection has been broken, step 403, the customer replays the protocol run starting from the transaction request message (Message 1 of the redemption protocol), step 404. The vendor identifies the presented certificate as already spent, and consults its recovery database (in which the protocol runs are stored), step 405. If the recovery database indicates that no acknowledgment from the customer has been received, step 406, then the vendor returns the stored response, step 407. As mentioned above, the transaction is skipped, but the customer receives a new validated blinded certificate to use in the next protocol run to engage in the transaction. Note that the customer does not identify itself during recovery in accordance with the present invention, advantageously protecting the customer's anonymity.

One embodiment of the present invention provides a membership that charges a fee for some or all of the transactions with a customer. For example, in one embodiment, the vendor becomes a mint for simple, single denomination digital tokens. The digital tokens correspond to digital cash roughly as tokens in a game arcade correspond to cons. The vendor can bill for these tokens by credit card, or some other suitable mechanism.

The customer spends previously purchased tokens during an electronic transaction in accordance with the present invention. In one embodiment, the tokens are spent in a transaction request message, and the vendor does not send a validated, blinded certificate to the customer unless the payment in tokens is valid and sufficient. In another embodiment, a transaction request message includes a credit balance, which must be paid periodically. Using a credit balance may, however, allow a vendor to link transactions and even tie them to customers, since the credit balance increases monotonically.

In accordance with an embodiment of the present invention, a certificate presented by the customer operates as a bearer authentication note that serves to reliably identify a member of a particular group (e.g., customers that have subscribed to a particular service) without compromising the group members' privacy. No certificate (bearer authentication note) can generally be linked by the vendor to any other, and so the transactions are anonymous.

Another embodiment of the present invention is used for voting. In this embodiment, a voter registers and receives a validated, blinded certificate to cast in a vote. The registration process ensures, for example, that each voter is entitled to cast only one vote. In one embodiment, a different electronic destination is provided for each option for which the vote may be cast. The voter unblinds the validated, blinded voting certificate and sends it to the destination corresponding to the option for which the voter chooses to vote. In another embodiment, the voter indicates its choice in a certificate, blinds it, sends it to be certified, receives it back, unblinds it, and sends it to an electronic destination. For example, in an election with two choices, an even random number (nonce) corresponds to the first choice, and an odd random number (nonce) corresponds to the second choice. The voter picks an odd or even nonce in accordance with the voter's choice, and votes in accordance with the present invention. This advantageously avoids having to designate different destinations for different votes.

Figure 5:
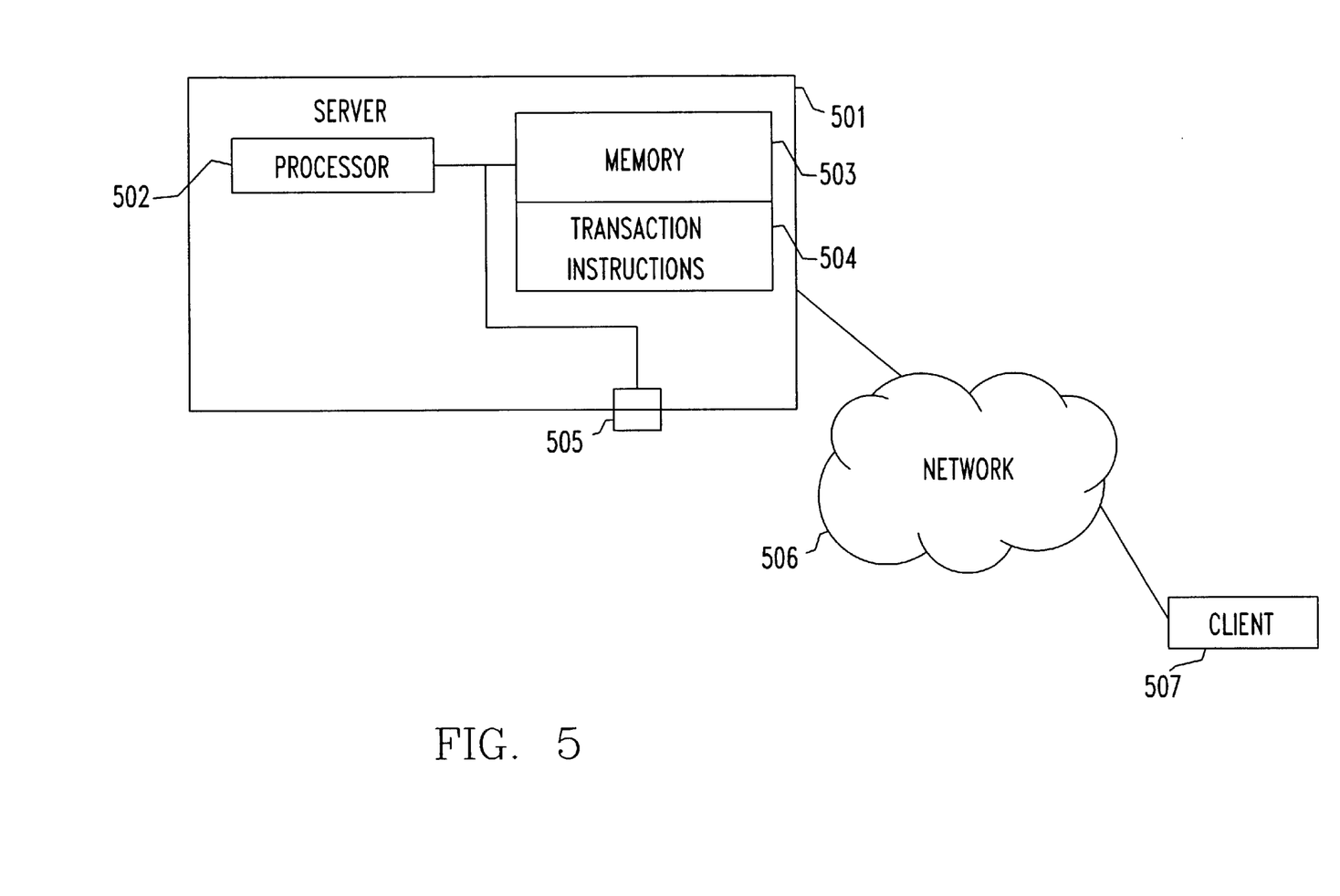
FIG. 5 shows an embodiment of the apparatus in accordance with the present invention.

An embodiment of an apparatus in accordance with the present invention is shown in FIG. 5. A server 501 includes a processor 502 coupled to a memory 503 that stores transaction instructions 504 that are adapted to be executed on processor 502. Server 501 further comprises a port 505 that is adapted to be coupled to a network 506. Port 505 is coupled to processor 502 and memory 503. A client (e.g., a customer) 507 is also coupled to the network 506.

Examples of memory 503 include a hard disk, Read Only Memory (ROM), Random Access Memory (RAM), a floppy disk, and any other medium capable of storing digital information.

Transaction instructions 504 can be distributed in accordance with the present invention stored on a medium. Examples of a medium that store the transaction instructions adapted to be executed by processor 502 include a hard disk, a floppy disk, a Compact Disk Read Only Memory (CD-ROM), flash memory, and any other device that can store digital information. In one embodiment, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor.

In one embodiment of the present invention, transaction instructions 504 are adapted to be executed by processor 502 to perform the steps of initializing a series of electronic transactions. For example, the instructions are adapted to be executed by processor 502 to receive an initialization request message that atomically binds authorization data and a blinded unvalidated certificate to be validated; determine if the authorization data is valid; if the authorization data is valid, then to validate the blinded unvalidated certificate to obtain a blinded validated certificate; and to send an initialization response message to a registrant that includes the blinded validated certificate atomically bound to the initialization request message.

In another embodiment of the present invention, transaction instructions 504 are adapted to be executed by processor 502 to perform an electronic transaction, e.g., to receive a transaction request message that atomically binds an unblinded certificate and a blinded unvalidated certificate to be validated; determine if the unblinded certificate is valid; and if the unblinded certificate is valid, then to perform a transaction response that validates the blinded unvalidated certificate to obtain a validated blinded certificate, and sends the validated blinded certificate atomically bound to the transaction request message to a transaction response recipient in a transaction response message.

In yet another embodiment, transaction instructions 504 are adapted to be executed by processor 502 to audit an electronic transaction, e.g., to receive a transaction request message that atomically binds an unblinded certificate and a blinded unvalidated certificate to be validated and blinded audit data; to send an audit request message atomically bound to the transaction request message to an audit recipient; to receive an audit response message atomically bound to the audit transaction message, where the audit response message includes audit response data; and to determine if the blinded audit data is valid using the audit response data.

Yet another embodiment of the present invention includes transaction instructions 504 that are adapted to be executed by processor 502 to recover from an interruption in an electronic transaction in accordance with the method of the present invention.

The present invention advantageously provides for anonymous, unlinkable electronic transactions that assure the vendor of payment while protecting the privacy of the customer.

What is claimed is:

1. A method for initializing a series of electronic transactions, comprising the steps of:
   a. receiving an initialization request message that atomically binds
      i. authorization data, and
      ii. a blinded unvalidated certificate to be validated;
   b. determining if the authorization data is valid;
   c. if the authorization data is valid, then validating the blinded unvalidated certificate to obtain a blinded validated certificate; and
   d. sending an initialization response message to a registrant that includes the blinded validated certificate atomically bound to the initialization request message received in step a.

2. The method of claim 1, further comprising the step of receiving a registration acknowledgment message from a registrant acknowledging that the registrant has received the initialization response message.

3. The method of claim 1, wherein the initialization request message includes a nonce, a session key and a blinding factor applied to the nonce, and further comprising the step of storing the initialization request message and the initialization response message in a recovery database.

4. A method for recovering from an interruption in initializing an electronic transaction, comprising the steps of:
   a. receiving a first initialization request message from a registrant that includes a nonce, a session key, and a blinding factor applied to the nonce, and that atomically binds
      i. authorization data, and
      ii. a blinded unvalidated certificate to be validated;
   b. storing the initialization request message in a recovery database;
   c. determining if the authorization data is valid;
   d. if the authorization data is valid, then validating the blinded unvalidated certificate to obtain a blinded validated certificate;
   e. sending a first initialization response message to a registrant that includes the blinded validated certificate atomically bound to the initialization request message received in step a;
   f. storing the first initialization response message in a recovery database;
   g. receiving a second initialization request message;
   h. determining if the second initialization request message has the same nonce, session key, and blinding factor applied to the nonce as the first initialization request message stored in the recovery database; and
   i. if the second initialization request message has the same nonce, session key, and blinding factor applied to the nonce as the first initialization request message, then
      1. retrieving the first initialization response message from the recovery database; and
      2. sending the first initialization response message to the registrant.

5. A method for performing an electronic transaction, comprising the steps of:
   a. receiving a transaction request message that atomically binds
      i. an unblinded certificate, and
      ii. a blinded unvalidated certificate to be validated;
   b. determining if the unblinded certificate is valid; and
   c. if the unblinded certificate is valid, then performing a transaction response that includes:

i. validating the blinded unvalidated certificate to obtain a validated blinded certificate, and ii. sending the validated blinded certificate atomically bound to the transaction request message to a transaction response recipient in a transaction response message.

6. The method of claim 5, wherein the transaction response further includes making available a product to a party.

7. The method of claim 5, wherein the transaction response further includes obtaining payment for a product.

8. The method of claim 5, further comprising the step of receiving a transaction acknowledgment message from a registrant acknowledging that the transaction response recipient has received the transaction response message.

9. The method of claim 5, further comprising the step of storing the transaction request message and the transaction response message in a recovery database.

10. A method for recovering from an interruption in an electronic transaction, comprising the steps of:

a. receiving a first transaction request message that includes a session key, a nonce and a blinding factor applied to the nonce, and that atomically binds
   i. an unblinded certificate, and
   ii. a blinded unvalidated certificate to be validated;

b. storing the first transaction request message in a recovery database;

c. determining if the unblinded certificate is valid; and d. if the unblinded certificate is valid, then performing a transaction response that includes
   i. validating the blinded unvalidated certificate to obtain a validated blinded certificate,
   ii. sending the validated blinded certificate atomically bound to the transaction request message to a transaction response recipient in a first transaction response message, and
   iii. storing the first transaction response message in a recovery database;

e. receiving a second transaction request message that includes a session key, a nonce and a blinding factor applied to the nonce, and that atomically binds
   i. an unblinded certificate, and
   ii. a blinded unvalidated certificate to be validated;

f. determining if the second transaction request message has the same nonce, session key, and blinding factor applied to the nonce as the first transaction request message stored in the recovery database; and g. if the second transaction request message has the same nonce, session key, and blinding factor applied to the nonce as the first transaction request message, then
   i. retrieving the first transaction response message from the recovery database, and
   ii. sending the first transaction response message to the transaction response recipient.

11. A method for auditing an electronic transaction, comprising the steps of:

a. receiving a transaction request message that atomically binds
   i. an unblinded certificate,
   ii. a blinded unvalidated certificate to be validated, and
   iii. blinded audit data;

b. sending an audit request message atomically bound to the transaction request message to an audit recipient;

c. receiving an audit response message atomically bound to the audit transaction message, wherein the audit response message includes audit response data;

d. determining if the blinded audit data is valid using the audit response data.

12. The method of claim 11, wherein the audit response data is determined to be valid if
   i. the audit response data corresponds to the blinded audit data received in the transaction request message, and
   ii. the audit response data is legitimate.

13. An apparatus for initializing a series of electronic transactions, comprising:

a. a processor; and b. a memory that stores instructions adapted to be executed by said processor to,
   i. receive an initialization request message that atomically binds authorization data and a blinded unvalidated certificate to be validated;
   ii. determine if the authorization data is valid;
   iii. if the authorization data is valid, then to validate the blinded unvalidated certificate to obtain a blinded validated certificate; and
   iv. send an initialization response message to a registrant that includes the blinded validated certificate atomically bound to the initialization request message, said memory coupled to said processor.

14. The apparatus of claim 13, further comprising a port adapted to be coupled to a network, said port coupled to said memory and said processor.

15. An apparatus for performing an electronic transaction, comprising:

a. a processor; and b. a memory that stores instructions adapted to be executed by a processor to
   i. receive a transaction request message that atomically binds an unblinded certificate and a blinded unvalidated certificate to be validated;
   ii. determine if the unblinded certificate is valid; and
   iii. if the unblinded certificate is valid, then to perform a transaction response that validates the blinded unvalidated certificate to obtain a validated blinded certificate, and sends the validated blinded certificate atomically bound to the transaction request message to a transaction response recipient in a transaction response message, said memory coupled to said processor.

16. The apparatus of claim 15, further comprising a port adapted to be coupled to a network, said port coupled to said memory and said processor.

17. An apparatus for auditing an electronic transaction, comprising:

a. a processor; and b. a memory that stores instructions adapted to be executed by said processor to
   i. receive a transaction request message that atomically binds an unblinded certificate and a blinded unvalidated certificate to be validated and blinded audit data;
   ii. send an audit request message atomically bound to the transaction request message to an audit recipient;
   iii. receive an audit response message atomically bound to the audit transaction message, where the audit response message includes audit response data; and
   iv. determine if the blinded audit data is valid using the audit response data, said memory coupled to said processor.

18. The apparatus of claim 17, further comprising a port adapted to be coupled to a network, said port coupled to said processor and said memory.

19. An apparatus for recovering from an interruption in an electronic transaction, comprising:
 a. a processor; and
 b. a memory that stores instructions adapted to be executed by said processor to
   i. receive a first transaction request message that includes a session key, a nonce and a blinding factor applied to the nonce, and that atomically binds an unblinded certificate and a blinded unvalidated certificate to be validated;
   ii. store the first transaction request message in a recovery database;
   iii. determine if the unblinded certificate is valid;
   iv. if the unblinded certificate is valid, then performing a transaction response that validates the blinded unvalidated certificate to obtain a validated blinded certificate, sends the validated blinded certificate atomically bound to the transaction request message to a transaction response recipient in a first transaction response message, and stores the first transaction response message in a recovery database;
   v. receive a second transaction request message that includes a session key, a nonce and a blinding factor applied to the nonce, and that atomically binds an unblinded certificate and a blinded unvalidated certificate to be validated;
   vi. determine if the second transaction request message has the same nonce, session key, and blinding factor applied to the nonce as the first transaction request message stored in the recovery database;
   vii. if the second transaction request message has the same nonce, session key, and blinding factor applied to the nonce as the first transaction request message, then to retrieve the first transaction response message from the recovery database and send the first transaction response message to the transaction response recipient,
 said memory coupled to said processor.

20. The apparatus of claim 19, further comprising a port adapted to be coupled to a network, said port coupled to said processor and said memory.

21. A medium that stores instructions adapted to be executed by a processor to perform the steps of:
 a. receiving an initialization request message that atomically binds
   i. authorization data, and
   ii. a blinded unvalidated certificate to be validated;
 b. determining if the authorization data is valid;
 c. if the authorization data is valid, then validating the blinded unvalidated certificate to obtain a blinded validated certificate; and
 d. sending an initialization response message to a registrant that includes the blinded validated certificate atomically bound to the initialization request message received in step a.

22. A medium that stores instructions adapted to be executed by a processor to perform the steps of:
 a. receiving a transaction request message that atomically binds
   i. an unblinded certificate, and
   ii. a blinded unvalidated certificate to be validated;
 b. determining if the unblinded certificate is valid; and
 c. if the unblinded certificate is valid, then performing a transaction response that includes
   i. validating the blinded unvalidated certificate to obtain a validated blinded certificate, and
   ii. sending the validated blinded certificate atomically bound to the transaction request message to a transaction response recipient in a transaction response message.

23. A medium that stores instructions adapted to be executed by a processor to perform the steps of:
 a. receiving a transaction request message that atomically binds
   i. an unblinded certificate,
   ii. a blinded unvalidated certificate to be validated, and
   iii. blinded audit data;
 b. sending an audit request message atomically bound to the transaction request message to an audit recipient;
 c. receiving an audit response message atomically bound to the audit transaction message, wherein the audit response message includes audit response data;
 d. determining if the blinded audit data is valid using the audit response data.

24. A system for performing an electronic transaction, comprising:
 a. means for receiving a transaction request message that atomically binds
   i. an unblinded certificate, and
   ii. a blinded unvalidated certificate to be validated;
 b. means for determining if the unblinded certificate is valid; and
 c. means for validating the blinded unvalidated certificate to obtain a validated blinded certificate; and
 d. means for sending the validated blinded certificate atomically bound to the transaction request message to a transaction response recipient in a transaction response message.

25. The system of claim 24, further comprising means for auditing an electronic transaction.

26. The system of claim 24, further comprising means for initializing a series of electronic transactions.

27. The system of claim 24, further comprising means for recovering from an interruption in an electronic transaction.

* * * * *